(12) United States Patent
Ogawa et al.

(10) Patent No.: US 8,696,892 B2
(45) Date of Patent: *Apr. 15, 2014

(54) APPARATUS FOR TREATING RADIOACTIVE NITRATE WASTE LIQUID

(75) Inventors: Naoki Ogawa, Hyogo (JP); Katsushi Shibata, Hyogo (JP); Kazuhiko Kuroda, Toyko (JP); Hiromitsu Nagayasu, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 848 days.

This patent is subject to a terminal disclaimer.

(21) Appl. No.: 12/811,896

(22) PCT Filed: Feb. 6, 2009

(86) PCT No.: PCT/JP2009/052097
§ 371 (c)(1),
(2), (4) Date: Jul. 7, 2010

(87) PCT Pub. No.: WO2009/099209
PCT Pub. Date: Aug. 13, 2009

(65) Prior Publication Data
US 2010/0276345 A1 Nov. 4, 2010

(30) Foreign Application Priority Data
Feb. 8, 2008 (JP) ................................ 2008-029554

(51) Int. Cl.
*C02F 3/30* (2006.01)
*C02F 11/00* (2006.01)
*G21F 9/18* (2006.01)
*B01D 61/58* (2006.01)

(52) U.S. Cl.
CPC ................ *C02F 3/305* (2013.01); *B01D 61/58* (2013.01); *G21F 9/18* (2013.01)
USPC ............ 210/85; 210/96.2; 210/151; 210/259; 588/20; 976/DIG. 386

(58) Field of Classification Search
CPC ............ C02F 3/305; C02F 3/30; B01D 61/58

USPC ................ 976/DIG. 386; 588/20; 435/262.5; 210/96.2, 151, 85, 259, 903
See application file for complete search history.

(56) References Cited

U.S. PATENT DOCUMENTS 8,409,438 B2 * 4/2013 Ogawa et al. ................. 210/603
8,465,646 B2 * 6/2013 Ogawa et al. ................. 210/605

FOREIGN PATENT DOCUMENTS

JP 7-013497 U 3/1995
JP 2003-225698 A 8/2003

(Continued)

OTHER PUBLICATIONS

Naoki Ogawa et al.,"Development of bio-treatment of high concentration sodium nitrate waste", 2006 Fall Meeting of the Atomic Energy Society of Japan, Aug. 17, 2006, p. 24.

(Continued)

*Primary Examiner* — Terry Cecil
(74) *Attorney, Agent, or Firm* — Westerman, Hattori, Daniels & Adrian, LLP (57) ABSTRACT

An apparatus for treating a radioactive nitrate waste liquid includes: a denitrification tank (12) that accommodates active sludge which adsorbs or takes in a radioactive substance in a nitrate waste liquid (11) containing nitrate and the radioactive substance and in which an anaerobic microorganism that reduces the nitrate to nitrogen gas grows; a reaeration tank (14) that aerates and mixes a denitrification-treated liquid (24) treated in the denitrification tank (12) with the active sludge in which the aerobic microorganism grows; and a sludge dissolution tank (81) that dissolves redundant sludge (26A, 26B) discharged from the denitrification tank (12) and the reaeration tank (14). Acetic peracid (80) is supplied to the sludge dissolution tank (81) to dissolve redundant sludge, a sludge lysate is supplied to the denitrification tank (12) as a carbon source (22), and acetic acid is supplied to the denitrification tank (12).

10 Claims, 6 Drawing Sheets

(56) References Cited

FOREIGN PATENT DOCUMENTS

| | | |
|---|---|---|
| JP | 3697037 B2 | 9/2005 |
| JP | 2006-015236 A | 1/2006 |
| JP | 2007-021285 A | 2/2007 |
| JP | 2007-105627 A | 4/2007 |
| JP | 2007-271306 A | 10/2007 |

OTHER PUBLICATIONS

Hiroshi Sagawa et al.,"Development of Radioactive Laundry Drain Treatment System by Activated Sludge Reactor", The Thermal and Nuclear Power, Apr. 15, 2003, p. 14-21, vol. 54 No. 559.
International Search Report of PCT/JP2009/052097, Mailing Date of Mar. 31, 2009.

* cited by examiner

RELATED ART

APPARATUS FOR TREATING RADIOACTIVE NITRATE WASTE LIQUID

TECHNICAL FIELD

The present invention relates to an apparatus for treating a radioactive nitrate waste liquid capable of reducing nitrate contained in waste water.

BACKGROUND ART

A nitrate waste liquid generated from nuclear facilities such as a reprocessing plant has high concentration (salt concentration of equal to or more than 1%) as well as being radioactive. Therefore, the nitrate waste liquid cannot be discharged as it is, and is finally cast into a cement-solidified form and disposed underground.

In recent years, there has been a concern that when the cement-solidified form contains nitrate, the nitrate may leak and pollute surrounding ground water and soil environment and thus dissolution of the nitrate is studied.

There are various methods for treating nitrate such as an electric reduction method, a chemical reduction method, and a biological reduction method. The electric reduction method has problems such as inhibition by heavy metals and generation of ammonia.

Besides, the chemical reduction method has problems such as exothermic reaction and generation of ammonia.

On the other hand, the biological reduction method allows treatment at an ordinary temperature and pressure and there is no generation of ammonia. Accordingly, the method of treating nitrate by using the biological treatment has been studied (Patent Document 1). However, in the method of Patent Document 1, only one type of carbon source is used, so the method has problems such that the amount of redundant sludge generated with the nitrate reduction treatment is increased and a secondary waste disposal expense is increased.

Figure 6:
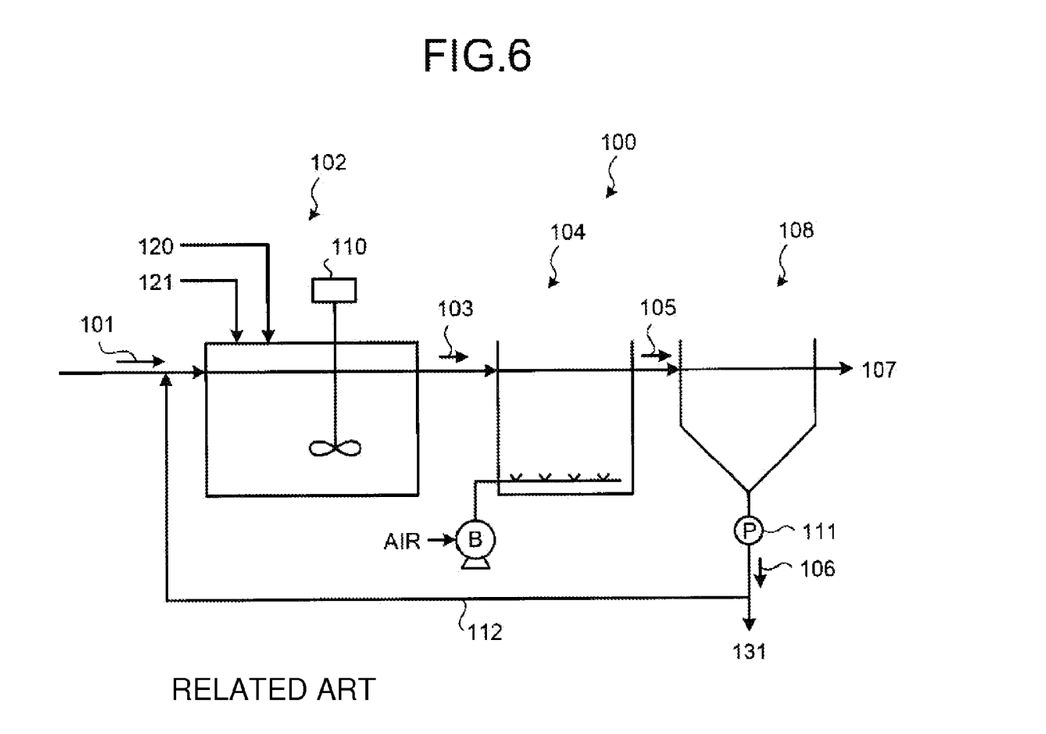
FIG. 6 is a schematic diagram of a configuration of a conventional apparatus for treating a radioactive nitrate waste liquid utilizing an organism.

FIG. 6 is a schematic diagram of a configuration of a conventional apparatus for treating a radioactive nitrate waste liquid utilizing an organism.

As shown in FIG. 6, a conventional apparatus 100 for treating a radioactive nitrate waste liquid includes a denitrification tank 102 that reduces nitrate, which is present in a nitrate waste liquid 101 generated from nuclear facilities (not shown), to nitrogen gas, a reaeration tank 104 that aerates and mixes a denitrified liquid 103 obtained by denitrification with active sludge, and a precipitation tank 108 that separates a reaerated liquid 105 that is a denitrification-treated liquid discharged from the reaeration tank 104 into precipitated sludge 106 and a treated liquid 107.

The denitrification tank 102 includes active sludge containing a large amount of denitrifying bacteria (not shown). In the denitrification tank 102, nitrate ions in a nitrate waste liquid are reduced to nitrogen gas ($N_2$) according to a reaction based on the following formula (1) by an action of an anaerobic microorganism (denitrifying bacteria) and is reduced from the nitrate waste liquid.

At this time, a carbon source 121 such as methanol and a pH adjuster 120 are supplied to the denitrification tank 102. Further, a mixer 110 is used to mix inside the denitrification tank 102.

$$NO_3^- + 5/6 CH_3OH \rightarrow 1/2 N_2 + 5/6 CO_2 + 7/6 H_2O + OH^- \quad (1)$$

Thereafter, the reaerated liquid 105 passes through the precipitation tank 108 from the reaeration tank 104, and is sent as a treated liquid 107 to a subsequent process (not shown). The sludge 106 precipitated in the precipitation tank 108 is recovered as redundant sludge 131 by a circulating pump 111. Further, a part of the sludge 106 precipitated in the precipitation tank 108 is returned to the denitrification tank 102 via a returned-sludge supplying line 112 and is reused. The sludge not reused is removed from a system as the redundant sludge 131 and is sent to a disposing process (not shown).

Further, there is used a method and an apparatus for treating a nitrate-containing waste liquid. The method includes a microbial treatment process of reducing nitrate nitrogen and nitrite nitrogen to nitrogen by using anaerobic denitrifying bacteria in microorganism-containing sludge, and the apparatus includes a plurality of treatment tanks (Patent Document 2).

Patent Document 1: Japanese Patent No. 3697037
Patent Document 2: Japanese Patent Application Laid-open No. 2007-105627

DISCLOSURE OF INVENTION

Problem to be Solved by the Invention

However, in the conventional apparatus 100 for treating a nitrate waste liquid, when the concentration of nitrate in the nitrate waste liquid 101 is low (salt concentration is less than 1%), the denitrifying bacteria is not perished; however, when the concentration of nitrate in the nitrate waste liquid 101 is high (for example, about 1 to 7%), there is a problem that the denitrifying bacteria may be perished due to a rise in pH with the biological denitrification reaction.

Further, there is also the following problem. That is, when the concentration of nitrate in the nitrate waste liquid 101 is high (for example, about 1 to 7%), water seeps from a living organism due to a rise in an osmotic pressure, its biology cannot be maintained and the living organism is perished. Therefore, a minute sludge floc is generated and the sludge 106 does not precipitate in the precipitation tank 108, resulting in the sludge 106 flowing backwards with the treated liquid 107.

Still another problem is that, when the carbon source 121 supplied in the denitrification tank 102 (for example, organic acid such as acetic acid or sweetener) is changed, there occurs a multiplication of microorganisms, an increase in the generated amount of redundant sludge 131, and an increase in the amount of disposal.

There is also a problem for nuclear facilities that the increased generated amount of the redundant sludge 131 leads to huge expenses for disposal, because a secondary waste is disposed underground as a solidified form. That is, there is a problem that the amount of the secondary waste needs to be decreased.

Facilities that treat a radioactive nitrate waste liquid need to be installed within a controlled area for radiation, and thus there is a demand for making the treatment facilities compact.

In addition, there is a demand that the amount of secondary waste needs to be reduced.

Furthermore, as a microbial treatment system to be installed within a controlled area for radiation, there is a demand that it is needed to stabilize reactions and performances.

In view of the above problems, an object of the present invention is to provide an apparatus for treating a radioactive nitrate waste liquid, which is installed within a controlled area for radiation and is capable of effectively microbially treating a waste liquid with a high nitrate concentration.

Means for Solving Problem

According to an aspect of the present invention, an apparatus for treating a radioactive nitrate waste liquid includes: a denitrification tank that accommodates active sludge which adsorbs or takes in a radioactive substance in a nitrate waste liquid containing nitrate and the radioactive substance and in which an anaerobic microorganism that reduces the nitrate to nitrogen gas grows; a reaeration tank that aerates and mixes a denitrification-treated liquid treated in the denitrification tank with the active sludge in which the aerobic microorganism grows; and a sludge dissolution tank that dissolves redundant sludge discharged from the denitrification tank and the reaeration tank. A sludge solvent is supplied to the sludge dissolution tank to dissolve redundant sludge, and a sludge lysate is supplied to the denitrification tank as a carbon source.

Advantageously, in the apparatus for treating a radioactive nitrate waste liquid, the sludge solvent is acetic peracid or a nitrate waste liquid of which pH is equal to or more than 12.

According to another aspect of the present invention, an apparatus for treating a radioactive nitrate waste liquid includes: a denitrification tank that accommodates active sludge which adsorbs or takes in a radioactive substance in a nitrate waste liquid containing nitrate and the radioactive substance and in which an anaerobic microorganism that reduces the nitrate to nitrogen gas grows; a reaeration tank that aerates and mixes a denitrification-treated liquid treated in the denitrification tank with the active sludge in which the aerobic microorganism grows; and a sludge dissolution tank that dissolves redundant sludge discharged from the denitrification tank and the reaeration tank. Acetic peracid is supplied to the sludge dissolution tank to dissolve redundant sludge, a sludge lysate is supplied to the denitrification tank as a carbon source, and acetic acid is supplied to the denitrification tank.

According to still another aspect of the present invention, an apparatus for treating a radioactive nitrate waste liquid includes: a denitrification tank that accommodates active sludge which adsorbs or takes in a radioactive substance in a nitrate waste liquid containing nitrate and the radioactive substance and in which an anaerobic microorganism that reduces the nitrate to nitrogen gas grows; a reaeration tank that aerates and mixes a denitrification-treated liquid treated in the denitrification tank with the active sludge in which the aerobic microorganism grows; and a sludge dissolution tank that dissolves redundant sludge discharged from the denitrification tank and the reaeration tank. A nitrate waste liquid of which pH is equal to or more than 12 is supplied to the sludge dissolution tank to dissolve redundant sludge, a sludge lysate is supplied to the denitrification tank as a carbon source, and a nitrate waste liquid is supplied to the denitrification tank.

Advantageously, in the apparatus for treating a radioactive nitrate waste liquid, the denitrification tank includes: a pH adjusting unit that supplies a pH adjuster used for adjusting pH of the nitrate waste liquid; a first solid-liquid separating unit that separates a denitrified liquid treated with the active sludge into a solid content containing sludge and a denitrification-treated liquid; and a gas supplying unit that is arranged on a lower side of the first solid-liquid separating unit and supplies gas not containing oxygen into the denitrification tank, and the reaeration tank includes: a second solid-liquid separating unit that further separates the denitrification-treated liquid treated with the active sludge into redundant sludge and a treated liquid; and an air supplying unit that is arranged on a lower side of the second solid-liquid separating unit and supplies air into the reaeration tank.

Advantageously, in the apparatus for treating a radioactive nitrate waste liquid, pH of the denitrified liquid in the denitrification tank is from 7.0 to 10.0.

Advantageously, in the apparatus for treating a radioactive nitrate waste liquid, the denitrification tank includes a gas circulating line through which nitrogen gas and carbon dioxide gas produced by a reaction between the aerobic microorganism and the nitrate in the denitrified liquid are circulated into the denitrification tank.

Advantageously, in the apparatus for treating a radioactive nitrate waste liquid, the first solid-liquid separating unit and the second solid-liquid separating unit are solid-liquid separating films.

Advantageously, the apparatus for treating a radioactive nitrate waste liquid further includes a total-organic-carbon measuring device that analyzes organic carbon in a nitrate waste liquid discharged from the sludge dissolution tank, and a total-nitrogen measuring device that measures an amount of nitrogen in a nitrogen compound in a nitrate waste liquid discharged from the sludge dissolution tank.

Advantageously, the apparatus for treating a radioactive nitrate waste liquid includes: an adjusting tank at an upstream of the denitrification tank. The adjusting tank includes: an electrical conductivity (EC) meter that measures a level of electric conductivity; an industrial-water introducing line; and an industrial-water supply-amount adjusting valve that is interposed through the industrial-water introducing line and adjusts an industrial-water supply amount based on a measurement value of the electrical conductivity meter.

Effect of the Invention

According to the present invention, a part of redundant sludge is supplied to a sludge dissolution tank, and the supplied sludge is decomposed by using acetic peracid or the like as a sludge solvent. Because a multiplied microorganism is perished and the perished microorganism is an organic substance, the decomposed material can be used as a carbon source that is supplied to a denitrification tank.

Further, the present invention includes a first solid-liquid separating unit that separates a denitrified liquid treated with active sludge in a denitrification tank into a sludge-containing solid content and a denitrification-treated liquid, and a second solid-liquid separating unit that further separates a reaerated liquid treated in a reaeration tank into a sludge-containing solid content and a reaeration-treated liquid. Therefore, minute sludge can be prevented from flowing out with a treated liquid.

EXPLANATIONS OF LETTERS OR NUMERALS 10A to 10D apparatus for treating radioactive nitrate waste liquid
11 nitrate waste liquid
12 denitrification tank
14 reaeration tank
21 pH adjuster
22 carbon source
23 denitrified liquid
24 denitrification-treated liquid
25 first solid-liquid separating film
26A, 26B solid content (redundant sludge)
27 reaeration-treated liquid
28 second solid-liquid separating film
29 reaerated liquid
30 gas supplying unit
31 gas discharge line
34 air supplying unit
35 blower
51 adjusting tank
52 electrical conductivity meter (EC meter)
53 industrial-water introducing line
54 industrial-water supply-amount adjusting valve
55 nitrate-waste-liquid supplying line
61 industrial water
62 diluter
63 biological treatment device
65 sludge
67 sludge dewatering device
68 dewatered sludge
69 incinerator
70 treated liquid
71 incinerated ashes
72 cleansing water
81 sludge dissolution tank

BEST MODE(S) FOR CARRYING OUT THE INVENTION

Exemplary embodiments of the present invention will be explained below in detail with reference to the accompanying drawings. Note that the present invention is not limited to the embodiments. In addition, constituent elements in the embodiments include those that can be easily assumed by those skilled in the art or that are substantially equivalent.

First Embodiment

An apparatus for treating a radioactive nitrate waste liquid according to an embodiment of the present invention is explained with reference to the drawings.

Figure 1:
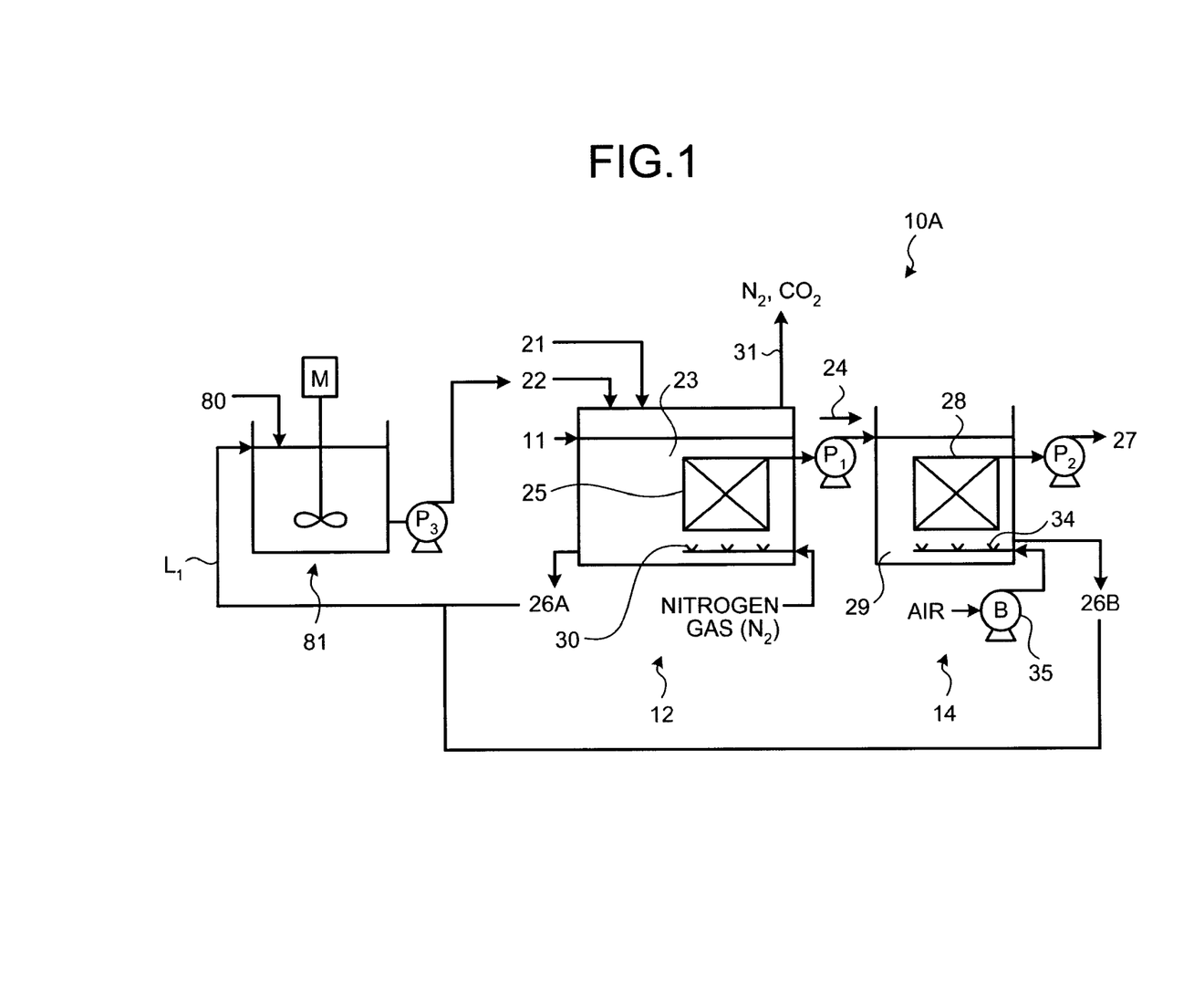
FIG. 1 is a conceptual diagram of an apparatus for treating a radioactive nitrate waste liquid according to a first embodiment of the present invention.

FIG. 1 is a conceptual diagram of the apparatus for treating a radioactive nitrate waste liquid according to a first embodiment of the present invention.

As shown in FIG. 1, an apparatus 10A for treating a radioactive nitrate waste liquid according to the present embodiment is an apparatus for treating a radioactive nitrate waste liquid that includes a denitrification tank 12 which accommodates active sludge that adsorbs or takes in a radioactive substance in a nitrate waste liquid 11 containing nitrate and the radioactive substance and in which an anaerobic microorganism that reduces the nitrate to nitrogen gas grows, and a reaeration tank 14 that aerates and mixes a denitrification-treated liquid 24 treated in the denitrification tank 12 with the active sludge in which an aerobic microorganism grows. The apparatus 10A includes a sludge dissolution tank 81 that dissolves redundant sludge 26A and 26B discharged from the denitrification tank 12 and the reaeration tank 14. In the apparatus 10A, acetic peracid 80 is supplied as a sludge solvent to the sludge dissolution tank 81 thereby to dissolve the redundant sludge, and a sludge lysate is supplied as a carbon source 22 to the denitrification tank 12.

The denitrification tank 12 includes a pH adjusting unit (not shown) that supplies a pH adjuster 21 used for adjusting pH of the nitrate waste liquid 11, a carbon-source supplying unit (not shown) that supplies the carbon source 22 to the denitrification tank 12, a first solid-liquid separating film 25 as a first solid-liquid separating unit that separates a denitrified liquid 23 treated with the active sludge into a solid content containing the sludge (the redundant sludge 26A) and a treated liquid, and a gas supplying unit 30 that is arranged on a lower side of the first solid-liquid separating film 25 and supplies gas not containing oxygen (for example, one or both of nitrogen gas ($N_2$) and carbon dioxide gas ($CO_2$)) into the denitrification tank 12. The reaeration tank 14 includes a second solid-liquid separating film 28 that reaerates the denitrification-treated liquid 24 treated with the active sludge to further separate a reaerated liquid 29 into the redundant sludge 26B and a reaeration-treated liquid 27, and an air supplying unit 34 that is arranged on a lower side of the second solid-liquid separating film 28 as a second solid-liquid separating unit and uses a blower 35 to supply air into the reaeration tank 14.

At a lower portion of the first solid-liquid separating film 25 and the second solid-liquid separating film 28, the gas supplying unit 30 and the air supplying unit 34 are arranged, respectively. When the supplied gas rises, a liquid mixed with the active sludge passes through surfaces of the separating films, and at this time, the liquid only permeates the films, and a solid-liquid separation is performed in this way. The active sludge that is left after the separation adheres to the film surface; however, the film surface is always cleansed with a flow of the supplied gas. As a result, the active sludge that adheres to the film surface is cleansed and reduced. This makes it possible to perform a solid-liquid separation by using the film surface that is always clean. In FIG. 1, reference character $P_1$ denotes a denitrification-treated-liquid supplying pump that supplies the denitrification-treated liquid 24 to the reaeration tank 14 and reference character $P_2$ denotes a reaeration-treated-liquid supplying pump that sends the reaeration-treated liquid 27.

In the present embodiment, parts of the redundant sludge 26A and 26B from the denitrification tank 12 and the reaeration tank 14 are supplied to the sludge dissolution tank 81 through a redundant-sludge supplying line $L_1$, and by using the acetic peracid 80 as the sludge solvent, the supplied parts are decomposed in the tank 81. Because the multiplied microorganism is perished and the perished microorganism is an organic substance, the decomposed material can be used as the carbon source 22 that is supplied to the denitrification tank 12 through a supplying pump $P_3$.

As the sludge solvent, the acetic peracid 80 is used, and thus, as a result of the decomposition, acetic acid is produced. The produced acid also is used as the carbon source 22, and therefore this eliminates necessity of additional carbon source or reduces addition of the carbon source.

That is, a material that originally contributes to a denitrification reaction can be obtained from the redundant sludge. Thus, in addition to a fact that the acetic peracid 80 is used for dissolution of the redundant sludge, the organic substance from the decomposed material and the acetic acid can be used as the carbon source 22 for the denitrification tank 12. Therefore, an effective utilization is achieved.

To perish the microorganism, substances such as chlorine and ozone can be used besides the acetic peracid. However, although these substances contribute to dissolution of the redundant sludge, they cannot be supplied to the denitrification tank after the dissolution and cause only adverse effects. Therefore, these substances are not preferable.

After the dissolution, the redundant sludge is re-used as the carbon source, and emitted as carbon dioxide gas. As a result, it is possible to decrease the generated amount of secondary waste.

Further, in the apparatus 10A for treating a radioactive nitrate waste liquid according to the present embodiment, the first solid-liquid separating film 25 and the second solid-liquid separating film 27 are respectively arranged in the denitrification tank 12 and the reaeration tank 14. Accordingly, the minute sludge can be completely separated into the denitrified liquid 23 or the reaerated liquid 29. This can prevent the sludge from flowing out. Although not limited thereto, examples of types of the first solid-liquid separating film 25 and the second solid-liquid separating film 28 include well-known solid-liquid separating films such as a flat film and a hollow fiber film.

As a result, when the minute sludge is completely separated from the denitrification-treated liquid 24 or the reaeration-treated liquid 27, it is possible to decrease the concentration of suspended solid (SS) of the discharged reaeration-treated liquid 27.

When the first solid-liquid separating film 25 is installed within the denitrification tank 12, it is possible to prevent denitrifying bacteria from flowing out, and there is no contamination of any other bacteria. Thus, only a large amount of denitrifying bacteria multiplied within the denitrification tank 12 exist in the tank. As a result, a sufficient amount of sludge can be secured, and the sludge concentration within the denitrification tank 12 can be maintained at a high level. Accordingly, a high-level denitrification performance of the denitrification tank 12 can be maintained and the apparatus can be made compact.

A high concentration level of the sludge within the denitrification tank 12 can be maintained, and thus the denitrification performance of the denitrification tank 12 can be enhanced and the apparatus can be made compact.

When the first solid-liquid separating film 25 and the second solid-liquid separating film 27 are arranged, a particulate radioactive substance contained in the nitrate waste liquid 11 can be also separated from the reaeration liquid 29. Thus, it is possible to decrease the radioactive concentration of the reaeration-treated liquid 27 discharged to outside and to decrease the radioactive concentration of the reaeration-treated liquid 27.

In the apparatus 10A for treating a radioactive nitrate waste liquid according to the present embodiment, the pH of the denitrified liquid 23 in the denitrification tank 12 is preferably adjusted from 7.0 to 10.0. It is preferable that the pH is from 8.0 to 9.5, and more preferably the pH is 8.0 to 9.0. This is because when the pH of the denitrified liquid 23 exceeds 10.0, the microorganism is perished. Moreover, when the pH is less than 7.0, a reaction rate for a treatment for reducing the nitrogen gas in the microorganism is decreased.

In the apparatus 10A for treating a radioactive nitrate waste liquid according to the present embodiment, the gas supplying unit 30 is arranged on a lower side (bottom surface side of the tank) of the first solid-liquid separating film 25 of the denitrification tank 12 so as to supply gas not containing oxygen (for example, nitrogen gas) to the denitrified liquid 23 of the denitrification tank 12. This is because when there is oxygen in the nitrate waste liquid 11, the reaction in the process for reducing nitrogen gas in the anaerobic microorganism is not progressed preferably.

By supplying nitrogen gas into the denitrified liquid 23 in the denitrification tank 12 via the gas supplying unit 30, the denitrified liquid 23 in the denitrification tank 12 can be forcedly stirred and the treatment for reducing the nitrogen gas by the microorganisms can be accelerated. Moreover, when nitrogen gas is supplied via the gas supplying unit 30 from below the first solid-liquid separating film 25, the active sludge that adheres to the first solid-liquid separating film 25 can be reduced. As a result, due to a gas cleansing effect, clogging of the film can be prevented.

In the apparatus 10A for treating a radioactive nitrate waste liquid according to the present embodiment, nitrogen gas ($N_2$ gas) is supplied by the gas supplying unit. However, the present invention is not limited thereto, and any gas that does not contain oxygen, such as carbon dioxide gas ($CO_2$ gas) and an inactive gas, can be used.

Further, in the apparatus 10A for treating a radioactive nitrate waste liquid according to the present embodiment, nitrogen gas ($N_2$) and carbon dioxide gas ($CO_2$) generated in the denitrification tank 12 are released to outside via a gas discharge line 31A.

In the apparatus 10A for treating a radioactive nitrate waste liquid according to the present embodiment, initially, the sludge used in sewage sludge or an industrial waste treatment is put in as seed sludge and active sludge multiplied until the active sludge concentration reaches, for example, about 5,000 to 20,000 mg/L, can be used. While the active sludge can be held by a granular carrier or a fibrous carrier, in the exemplary embodiments of the present invention, various types of such carriers are not used, and floating active sludge is preferably used.

In the apparatus 10A for treating a radioactive nitrate waste liquid according to the present embodiment, the decomposed material obtained from the redundant sludge can be used as the carbon source 22. When the carbon source 22 is separately supplied from outside, although the present invention is not limited thereto, organic acid can be used as the carbon source 22.

In the apparatus 10A for treating a radioactive nitrate waste liquid according to the present embodiment, although the present invention is not limited thereto, examples of the pH adjuster 21 include sulfuric acid and hydrochloric acid.

In the apparatus 10A for treating a radioactive nitrate waste liquid according to the present embodiment, as the microorganism contained in the active sludge in the denitrification tank 12, a well-known anaerobic microorganism that exhibits a denitrification performance can be used. Although not particularly limited thereto, in the reaeration tank 14, a well-known aerobic microorganism for a reaeration can be used.

In the apparatus 10A for treating a radioactive nitrate waste liquid according to the present embodiment, the solid-liquid separating film is used as a solid-liquid separating unit; however, the present invention is not limited thereto, and any unit that can separate the sludge and the liquid can be used.

As described above, in the apparatus 10A for treating a radioactive nitrate waste liquid according to the present embodiment, parts of the redundant sludge 26A and 26B are supplied to the sludge dissolution tank 81, and by using the acetic peracid 80 as a sludge solvent, the supplied sludge is decomposed in the tank 81. Because the multiplied microorganism is perished and the perished microorganism is an organic substance, the decomposed material can be used as the carbon source 22 that is supplied to the denitrification tank 12.

The acetic peracid 80 is used as a sludge solvent and, as a result of the decomposition, acetic acid is produced. The produced acetic acid also becomes the carbon source 22, and therefore this eliminates necessity of additional carbon source or reduces addition of the carbon source.

Furthermore, the first solid-liquid separating film 25 and the second solid-liquid separating film 28 are respectively arranged in the denitrification tank 12 and the reaeration tank 14. Accordingly, the minute sludge can be completely separated into the denitrification-treated liquid 24 and the reaeration-treated liquid 27. Thus, the sludge can be prevented from flowing out. Moreover, the concentration of suspended solid (SS) in the reaeration-treated liquid 27 that is discharged from the reaeration tank 14 and is separately treated can be improved.

Because a sufficient amount of sludge can be secured within the denitrification tank 12, the sludge concentration within the denitrification tank 12 can be maintained at a high level. Therefore, a high-level denitrification performance of the denitrification tank 12 can be maintained and the apparatus can be made compact.

In the denitrification tank 12, a gas circulating line (not shown) through which the nitrogen gas ($N_2$) and the carbon dioxide gas ($CO_2$) produced as a result of a reaction between the anaerobic microorganism and the nitrate in the denitrified liquid 23 are circulated within the denitrification tank 12 is arranged and branched from a part of the gas discharge line 31.

As a result, the nitrogen gas ($N_2$) and the carbon dioxide gas ($CO_2$) generated in the denitrification tank 12 are fed to the gas supplying unit 30 by using a blower interposed through a gas circulating line, and can be introduced into the denitrification tank 12.

In this way, the nitrogen gas ($N_2$) and the carbon dioxide gas ($CO_2$) generated as a result of the microorganism reaction within the denitrification tank 12 are re-circulated and re-used within the denitrification tank. Therefore, there is no need to separately arrange the nitrogen gas supplying unit (as shown in FIG. 1) that supplies gas not containing oxygen. As a result, it is possible to eliminate the nitrogen gas supplying unit and to reduce gas purchasing costs.

Test Example

By using the apparatus according to the present embodiment, a denitrification test was conducted on a nitrate waste liquid having an undiluted nitrate nitrogen concentration of 6700 to 9200 mg/L (salt concentration: 4.0 to 5.5%) by using methanol and acetic acid as a carbon source with a test temperature set to 20 to 25° C. (room temperature).

When the first solid-liquid separating film was not arranged in the denitrification tank, the denitrification performance reached 2 kg-N/$m^3$/d, whereas when the first solid-liquid separating film was arranged in the denitrification tank, the denitrification performance was improved to 7 kg-N/$m^3$/d.

While the denitrification performance of 7 kg-N/$m^3$/d when the first solid-liquid separating film was arranged in the denitrification tank was maintained, the generated amount of redundant sludge was reduced to below ⅔ and an amount of carbon source to be added (acetic peracid+acetic acid) was reduced to below ½.

Second Embodiment

An apparatus for treating a radioactive nitrate waste liquid according to a second embodiment of the present invention is explained with reference to FIG. 2.

An apparatus 10B for treating a radioactive nitrate waste liquid according to the present embodiment is configured substantially identical to the apparatus 10A for treating a radioactive nitrate waste liquid according to the first embodiment shown in FIG. 1, and thus like reference letters or numerals are denoted to like constituent elements of the apparatus for treating a radioactive nitrate waste liquid according to the first embodiment shown in FIG. 1, and redundant explanations thereof will be omitted.

Figure 2:
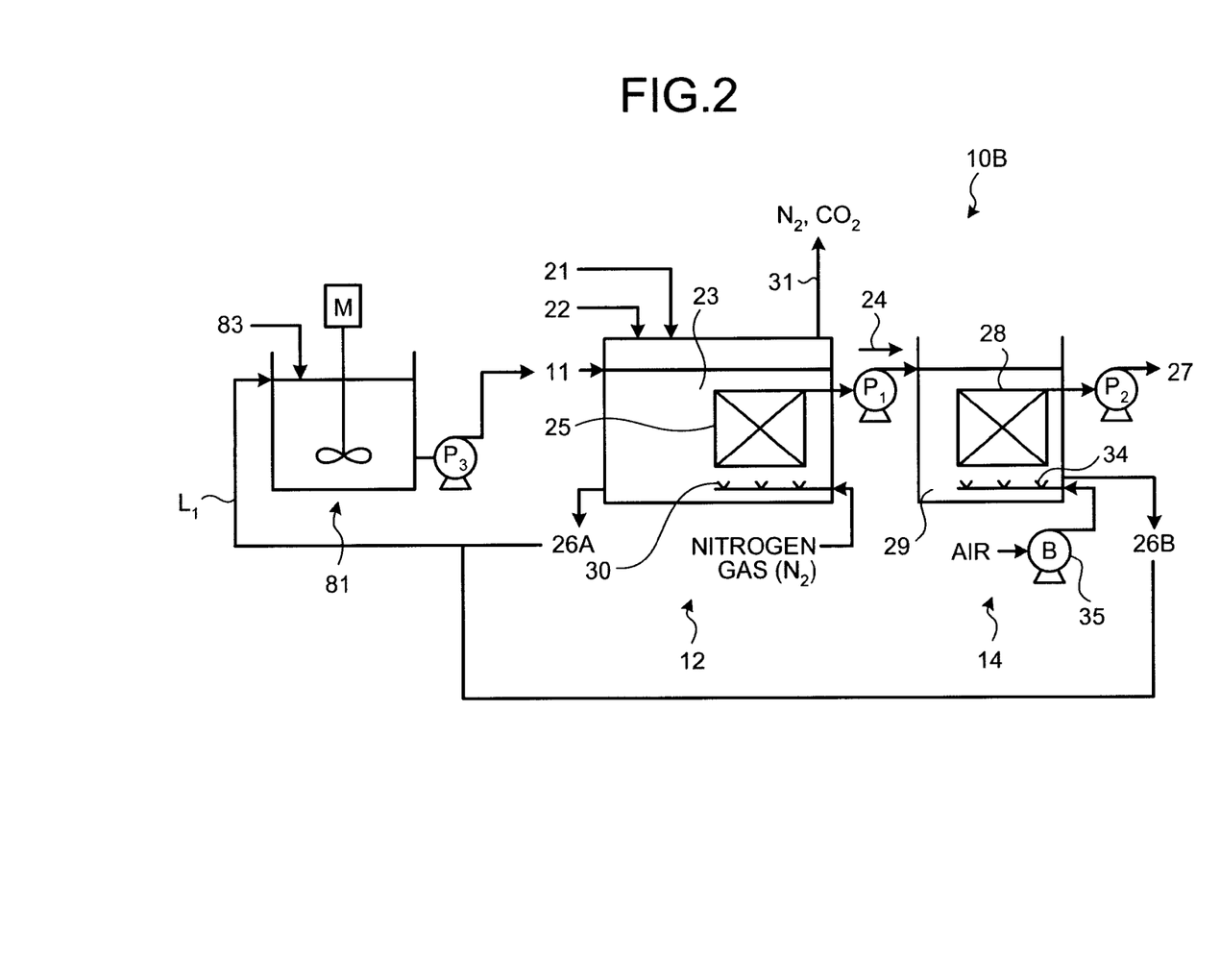
FIG. 2 is a schematic diagram of a configuration of an apparatus for treating a radioactive nitrate waste liquid according to a second embodiment of the present invention.

FIG. 2 is a schematic diagram of a configuration of the apparatus for treating a radioactive nitrate waste liquid according to the second embodiment of the present invention. As shown in FIG. 2, the apparatus 10B for treating a radioactive nitrate waste liquid according to the present embodiment is configured to use a nitrate waste liquid (undiluted liquid) 83 having pH of equal to or more than 12 as the sludge solvent added to the sludge dissolution tank 81.

In the present embodiment, instead of acetic peracid, an alkaline (pH is equal to or more than 12) nitrate waste liquid (undiluted liquid) is used. Thus, the redundant sludge 26A and 26B is dissolved under an alkaline condition and becomes a solution in which an organic substance is dissolved. The solution is supplied as the nitrate waste liquid 11 to the denitrification tank 12, and the organic substance is utilized as the carbon source.

The nitrate waste liquid (undiluted liquid) 83 reduces its pH as a result of the dissolution of the sludge dissolution tank 81. Accordingly, it is possible to reduce a usage amount of the pH adjuster 21 added in the denitrification tank 12.

Third Embodiment

An apparatus for treating a radioactive nitrate waste liquid according to a third embodiment of the present invention is explained with reference to FIG. 3.

The apparatus for treating a radioactive nitrate waste liquid according to the present embodiment is configured substantially identical to the apparatus for treating a radioactive nitrate waste liquid according to the first embodiment shown in FIG. 1, and thus like reference numerals are denoted to like constituent elements of the apparatus for treating a radioactive nitrate waste liquid according to the first embodiment shown in FIG. 1, and redundant explanations thereof will be omitted.

Figure 3:
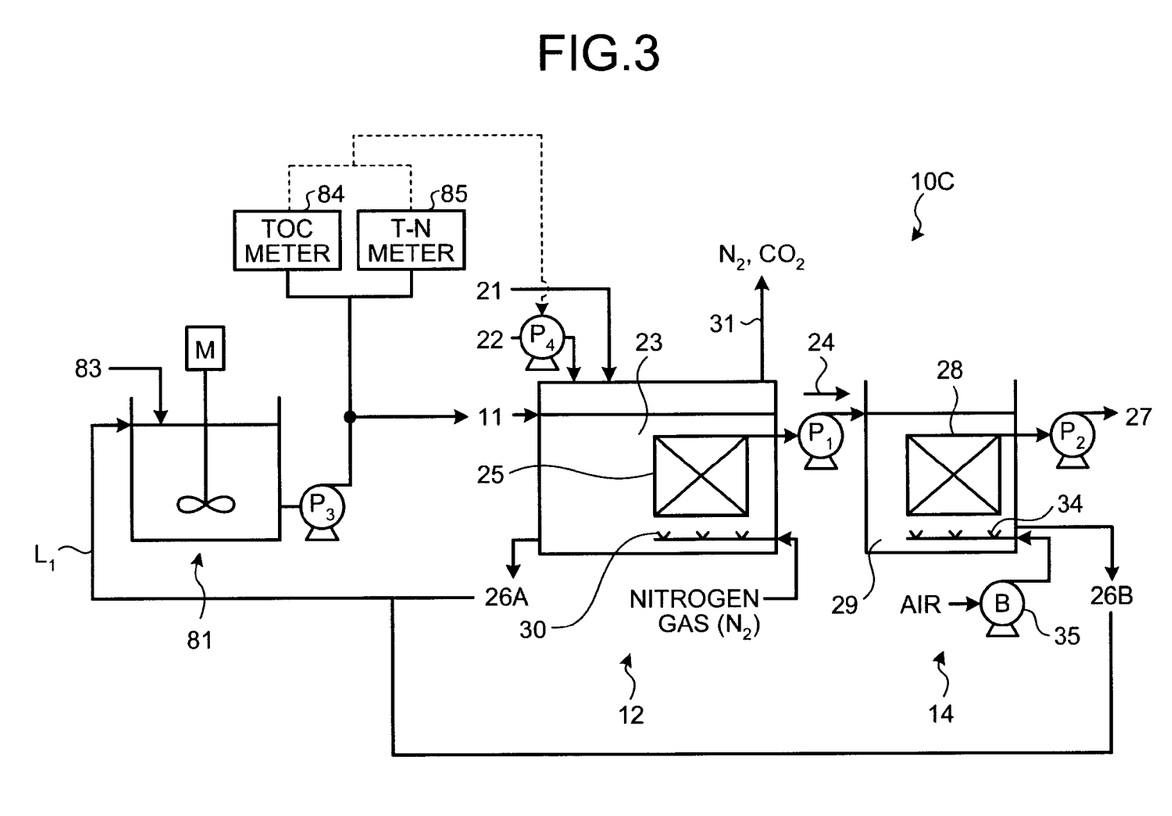
FIG. 3 is a schematic diagram of a configuration of an apparatus for treating a radioactive nitrate waste liquid according to a third embodiment of the present invention.

FIG. 3 is a schematic diagram of a configuration of the apparatus for treating a radioactive nitrate waste liquid according to the third embodiment of the present invention.

As shown in FIG. 3, an apparatus 10C for treating a radioactive nitrate waste liquid according to the present embodiment includes a total-organic-carbon measuring device (TOC) 84 that analyzes an organic carbon in the nitrate waste liquid 11 discharged from the sludge dissolution tank 81 and a total-nitrogen measuring device (T-N) 85 that measures the amount of nitrogen in a nitrogen compound in the nitrate waste liquid 11.

Based on this measurement result, the amount of the carbon source 22 separately added to the denitrification tank 12 is adjusted to increase or decrease so that the value of the TOC/T-N is from 7.5 to 11 (in terms of C/N, 3.0 to 4.5).

Accordingly, there is no excessive supply of the excessive carbon source 22 and an appropriate amount of the carbon source can be supplied, and thus a stable denitrification reaction can be performed.

Therefore, it becomes possible to decrease the amount of carbon source to be added and also to decrease the generated amount of secondary waste.

Fourth Embodiment

An apparatus for treating a radioactive nitrate waste liquid according to a fourth embodiment of the present invention is explained with reference to FIG. 4.

The apparatus for treating a radioactive nitrate waste liquid according to the present embodiment is configured substantially identical to the apparatus for treating a radioactive nitrate waste liquid according to the first embodiment shown in FIG. 1, and thus like reference letters or numerals are denoted to like constituent elements of the apparatus for treating a radioactive nitrate waste liquid according to the first embodiment shown in FIG. 1, and redundant explanations thereof will be omitted.

Figure 4:
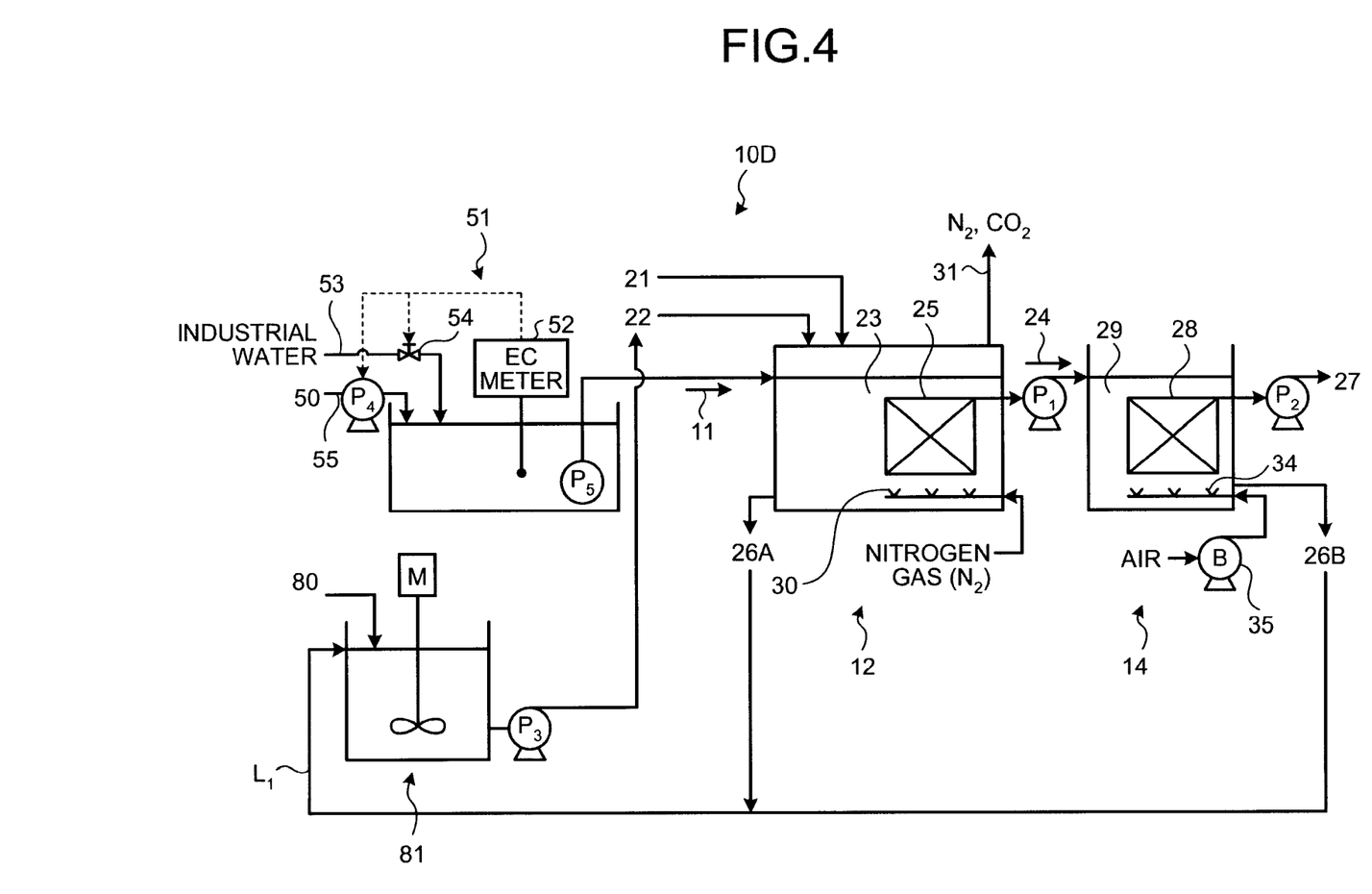
FIG. 4 is a schematic diagram of a configuration of an apparatus for treating a radioactive nitrate waste liquid according to a fourth embodiment of the present invention.

FIG. 4 is a schematic diagram of a configuration of the apparatus for treating a radioactive nitrate waste liquid according to the fourth embodiment of the present invention.

As shown in FIG. 4, in an apparatus 10D for treating a radioactive nitrate waste liquid according to the present embodiment, an adjusting tank 51 that supplies a nitrate waste liquid (undiluted: salt concentration of 30 to 40%) 50 is arranged at an upstream of the denitrification tank 12 of the apparatus 10A for treating a radioactive nitrate waste liquid according to the first embodiment shown in FIG. 1. The adjusting tank 51 includes an electrical conductivity meter (EC meter) 52 that measures a level of electric conductivity, an industrial-water introducing line 53, and an industrial-water supply-amount adjusting valve 54 which is arranged in the industrial-water introducing line 53 and which adjusts a flow rate of water to be diluted based on a measurement value of the electrical conductivity meter 52.

The industrial-water supply-amount adjusting valve 54 arranged in the industrial-water introducing line 53 is controlled based on the EC value measured by the electrical conductivity meter (EC meter) 52 arranged in the adjusting tank 51 to adjust the flow rate of water supplied to the adjusting tank 51.

Specifically, when the EC value measured by the electrical conductivity meter (EC meter) 52 is high, the industrial-water supply-amount adjusting valve 54 is opened, and when the EC value measured by the electrical conductivity meter (EC meter) 52 is low, the industrial-water supply-amount adjusting valve 54 is closed.

In the apparatus 10D for treating a radioactive nitrate waste liquid according to the present embodiment, when a biological treatment is performed in a high salt concentration state of about 4%, for example, by diluting the nitrate waste liquid (undiluted: salt concentration of 30 to 40%), a control range of an EC value measured by the electrical conductivity meter (EC meter) 52 at this time is preferably from 50 to 70 mS/cm, and more preferably from 53 to 68 mS/cm.

In the apparatus 10D for treating a radioactive nitrate waste liquid according to the present embodiment, a nitrate-waste-liquid supplying pump $P_4$ is arranged in a nitrate-waste-liquid supplying line 55 that feeds the nitrate waste liquid 50 (undiluted liquid) to the adjusting tank 51. Based on the EC value measured by the electrical conductivity meter (EC meter) 52, the nitrate-waste-liquid supplying pump $P_4$ is controlled, and a supply amount of the nitrate waste liquid 50 (undiluted liquid) to be fed to the adjusting tank 51 is thus adjusted.

Specifically, when the EC value measured by the electrical conductivity meter (EC meter) 52 is high, the nitrate-waste-liquid supplying pump $P_4$ is stopped to halt supplying of the undiluted nitrate waste liquid 50 to the adjusting tank 51, and when the EC value measured by the electrical conductivity meter (EC meter) 52 is low, the nitrate-waste-liquid supplying pump $P_4$ is operated and the nitrate waste liquid 50 (undiluted liquid) is supplied to the adjusting tank 51.

As a result, the concentration of a high-concentration nitrate waste liquid from treatment facilities is not always constant, and thus, even when the concentration of the nitrate waste liquid (undiluted liquid) 50 is not constant, it is possible to prevent transferring variation of the salt concentration in the nitrate waste liquid (undiluted liquid) 50 to the denitrification tank 12. This makes it possible to prevent a significant decrease in denitrification performance caused when the salt concentration is greatly varied.

Further, the nitrate waste liquid (diluted solution) 11 with a constant salt concentration can be supplied to the denitrification tank 12 via the nitrate-waste-liquid supplying pump $P_5$, and thus the denitrification performance can be stabilized.

Fifth Embodiment

A biological treatment system using the apparatus for treating a radioactive nitrate waste liquid according to a fifth embodiment of the present invention is explained with reference to FIG. 5.

As the apparatus for treating a radioactive nitrate waste liquid according to the present embodiment, any one of the apparatuses for treating a radioactive nitrate waste liquid according to the first to fourth embodiments shown in FIGS. 1 to 4 can be used, and thus explanations thereof will be omitted.

Figure 5:
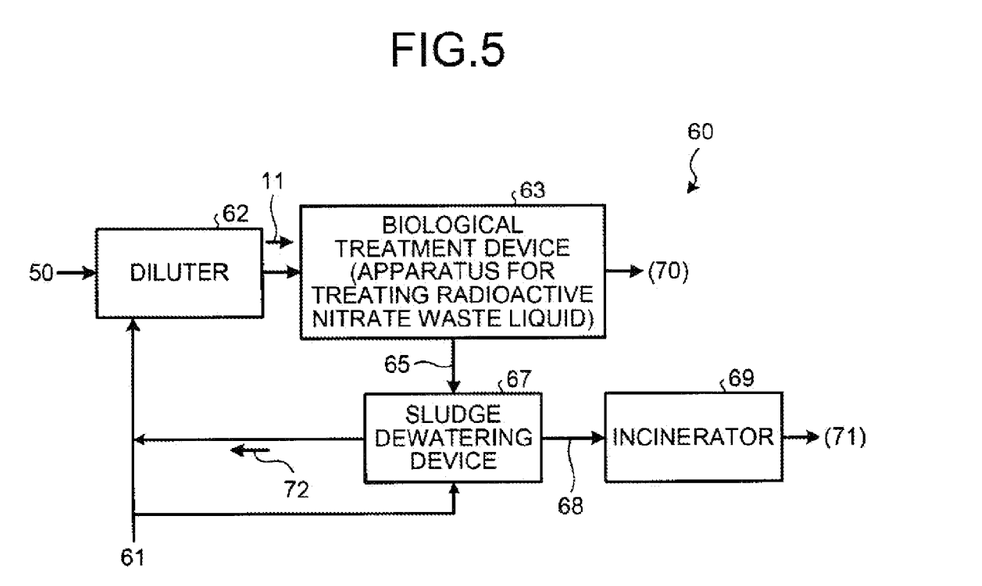
FIG. 5 is a schematic diagram of a configuration of a biological treatment system using an apparatus for treating a radioactive nitrate waste liquid according to a fifth embodiment of the present invention.

As shown in FIG. 5, the biological treatment system 60 according to the present embodiment includes a diluter 62 that dilutes the nitrate waste liquid (undiluted liquid) 50 with industrial water 61, a biological treatment device (any one of the apparatuses for treating a radioactive nitrate waste liquid according to the first to fourth embodiments) 63 in which nitrate ions in the diluted nitrate waste liquid 11 are microbially treated for reduction with nitrogen and reaeration, a sludge dewatering device 67 that separates sludge 65 and a treated liquid 70 from the biologically treated liquid treated in the biological treatment device 63 and dewaters the separated sludge 65, and an incinerator 69 that incinerates dewatered sludge 68.

The diluter 62 operates in the adjusting tank 51 that dilutes an undiluted liquid as shown in FIG. 4 corresponding to the fourth embodiment described above.

The biological treatment device 63 is an apparatus for treating a radioactive nitrate waste liquid configured by the denitrification tank 12 having the sludge dissolution tank 81 and the reaeration tank 14.

The sludge dewatering device 67 dewaters the redundant sludge discharged from the denitrification tank and the reaeration tank of the biological treatment device 63. The incinerator 69 incinerates the dewatered sludge 68 or secondary waste discharged from the sludge dewatering device 67 into incinerated ashes 71.

In the biological treatment device 63 that biologically treats the nitrate waste liquid having a high salt concentration, at the time of dewatering the redundant sludge, the salt concentration in the water that adheres to the sludge is high, and thus an amount of secondary waste (incinerated ashes) occasionally increases. For this, in the redundant sludge dewatering device 67, the industrial water 61 is added to flush the adhered liquid having a high salt concentration, and flushed cleansing water 72 is used as diluting water in the diluter 62 that dilutes the nitrate waste liquid 11.

Therefore, a part of the industrial water 61 used in the diluter 62 is used for cleansing at the time of dewatering, and thus there is no need to use additional industrial water 61. Further, by decreasing the salt concentration in the adhering water, the amount of the secondary waste (incinerated ashes) can be decreased to about ½.

INDUSTRIAL APPLICABILITY

As described above, by using the apparatus for treating a radioactive nitrate waste liquid according to the present invention, a waste liquid with a high nitrate concentration discharged from nuclear facilities such as a reprocessing plant can be microbially treated efficiently, and minute sludge can be prevented from flowing out with a treated liquid.

The invention claimed is:

1. An apparatus for treating a radioactive nitrate waste liquid, comprising:
   a denitrification tank that accommodates active sludge which adsorbs or takes in a radioactive substance in a nitrate waste liquid containing nitrate and the radioactive substance and in which an anaerobic microorganism that reduces the nitrate to nitrogen gas grows;
   a reaeration tank that aerates and mixes a denitrification-treated liquid treated in the denitrification tank with the active sludge in which an microorganism grows; and
   a sludge dissolution tank that dissolves redundant sludge discharged from the denitrification tank and the reaeration tank, wherein
   a sludge solvent is supplied to the sludge dissolution tank to dissolve redundant sludge, and a sludge lysate is supplied to the denitrification tank as a carbon source and wherein
   the denitrification tank comprises:
   a first solid-liquid separating unit that separates a denitrified liquid treated with the active sludge into a solid content containing sludge and a denitrification-treated liquid; and
   a gas supplying unit that is arranged on a lower side of the first solid-liquid separating unit and supplies gas not containing oxygen into the denitrification tank, and
   the reaeration tank comprises:
   a second solid-liquid separating unit that further separates the denitrification-treated liquid treated with the active sludge into redundant sludge and a treated liquid; and
   an air supplying unit that is arranged on a lower side of the second solid-liquid separating unit and supplies air into the reaeration tank.

2. The apparatus for treating a radioactive nitrate waste liquid according to claim 1, wherein the sludge solvent is acetic peracid or a nitrate waste liquid of which pH is equal to or more than 12.

3. The apparatus for treating a radioactive nitrate waste liquid according to claim 1, wherein
   the denitrification tank comprises:
   a pH adjusting unit that supplies a pH adjuster used for adjusting pH of the nitrate waste liquid.

4. The apparatus for treating a radioactive nitrate waste liquid according to claim 3, wherein the first solid-liquid separating unit and the second solid-liquid separating unit are solid-liquid separating films.

5. The apparatus for treating a radioactive nitrate waste liquid according to claim 1, wherein pH of the denitrified liquid in the denitrification tank is from 7.0 to 10.0.

6. The apparatus for treating a radioactive nitrate waste liquid according to claim 1, wherein the denitrification tank includes a gas circulating line through which nitrogen gas and carbon dioxide gas produced by a reaction between the aerobic microorganism and the nitrate in the denitrified liquid are circulated into the denitrification tank.

7. The apparatus for treating a radioactive nitrate waste liquid according to claim 1, comprising
   an adjusting tank at an upstream of the denitrification tank, wherein
   the adjusting tank comprises:
   an electrical conductivity (EC) meter that measures a level of electric conductivity;
   an industrial-water introducing line; and
   an industrial-water supply-amount adjusting valve that is interposed through the industrial-water introducing line and adjusts an industrial-water supply amount based on a measurement value of the electrical conductivity meter.

8. An apparatus for treating a radioactive nitrate waste liquid, comprising:
   a denitrification tank that accommodates active sludge which adsorbs or takes in a radioactive substance in a nitrate waste liquid containing nitrate and the radioactive substance and in which an anaerobic microorganism that reduces the nitrate to nitrogen gas grows;
   a reaeration tank that aerates and mixes a denitrification-treated liquid treated in the denitrification tank with the active sludge in which an microorganism grows; and
   a sludge dissolution tank that dissolves redundant sludge discharged from the denitrification tank and the reaeration tank, wherein
   acetic peracid is supplied to the sludge dissolution tank to dissolve redundant sludge, a sludge lysate is supplied to the denitrification tank as a carbon source, and acetic acid generated from the acetic peracid is supplied to the denitrification tank and wherein
   the denitrification tank comprises:
   a first solid-liquid separating unit that separates a denitrified liquid treated with the active sludge into a solid content containing sludge and a denitrification-treated liquid; and
   a gas supplying unit that is arranged on a lower side of the first solid-liquid separating unit and supplies gas not containing oxygen into the denitrification tank, and
   the reaeration tank comprises:
   a second solid-liquid separating unit that further separates the denitrification-treated liquid treated with the active sludge into redundant sludge and a treated liquid; and
   an air supplying unit that is arranged on a lower side of the second solid-liquid separating unit and supplies air into the reaeration tank.

9. An apparatus for treating a radioactive nitrate waste liquid, comprising:
   a denitrification tank that accommodates active sludge which adsorbs or takes in a radioactive substance in a nitrate waste liquid containing nitrate and the radioactive substance and in which an anaerobic microorganism that reduces the nitrate to nitrogen gas grows;

a reaeration tank that aerates and mixes a denitrification-treated liquid treated in the denitrification tank with the active sludge in which an microorganism grows; and a sludge dissolution tank that dissolves redundant sludge discharged from the denitrification tank and the reaeration tank, wherein a nitrate waste liquid of which pH is equal to or more than 12 is supplied to the sludge dissolution tank to dissolve redundant sludge, a sludge lysate is supplied to the denitrification tank as a carbon source, and a nitrate waste liquid is supplied to the denitrification tank and wherein the denitrification tank comprises:

a first solid-liquid separating unit that separates a denitrified liquid treated with the active sludge into a solid content containing sludge and a denitrification-treated liquid; and a gas supplying unit that is arranged on a lower side of the first solid-liquid separating unit and supplies gas not containing oxygen into the denitrification tank, and the reaeration tank comprises:

a second solid-liquid separating unit that further separates the denitrification-treated liquid treated with the active sludge into redundant sludge and a treated liquid; and an air supplying unit that is arranged on a lower side of the second solid-liquid separating unit and supplies air into the reaeration tank.

10. The apparatus for treating a radioactive nitrate waste liquid according to claim 9, further comprising:

a total-organic-carbon measuring device that analyzes organic carbon in a nitrate waste liquid discharged from the sludge dissolution tank, and a total-nitrogen measuring device that measures an amount of nitrogen in a nitrogen compound in a nitrate waste liquid discharged from the sludge dissolution tank.

* * * * *